(12) United States Patent
Koerwien et al.

(10) Patent No.: US 10,343,373 B2
(45) Date of Patent: Jul. 9, 2019

(54) COATED COMPOSITE COMPONENT

(71) Applicant: Airbus Defence and Space GmbH, Taufkirchen (DE)

(72) Inventors: Thomas Koerwien, Hoehenkirchen (DE); Michael Hoffmann, Bremen (DE); Robert Meissner, Bremen (DE); Helmut Wehlan, Augsburg (DE); Andreas Roessmann, Munich (DE); Jens Holtmannspoetter, Erding (DE); Sebastian Heckner, Munich (DE); Thomas Meer, Egmating (DE); Matthias Geistbeck, Mindelheim (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 208 days.

(21) Appl. No.: 15/381,678

(22) Filed: Dec. 16, 2016

(65) Prior Publication Data

US 2017/0175307 A1    Jun. 22, 2017

(30) Foreign Application Priority Data

Dec. 16, 2015  (DE) .................. 10 2015 225 467

(51) Int. Cl.
*B23B 7/06* (2006.01)
*B29C 65/00* (2006.01)
(Continued)

(52) U.S. Cl.
CPC ............... *B32B 7/06* (2013.01); *B29C 66/02* (2013.01); *B29C 66/721* (2013.01);
(Continued)

(58) Field of Classification Search
None
See application file for complete search history.

(56) References Cited

U.S. PATENT DOCUMENTS 3,311,520 A * 3/1967 Michaelson ............ B32B 37/00
156/209
3,666,600 A * 5/1972 Yoshino .................. B32B 27/36
156/382

(Continued)

FOREIGN PATENT DOCUMENTS

CN     102501393 A  *  6/2012  ............. B29C 70/54
DE  102011056703 A1  *  6/2013  ............. B29B 15/10

(Continued)

OTHER PUBLICATIONS

Machine Translation of EP 65765 A1, Dec. 1982 (Year: 1982).*

(Continued)

*Primary Examiner* — Jeffrey A Vonch
(74) *Attorney, Agent, or Firm* — Jenkins, Wilson, Taylor & Hunt, P.A.

(57) ABSTRACT

A coated composite component includes, in this order, a composite component, a fluorine-containing film and/or a fluorine-containing woven fabric, knitted fabric or crocheted fabric, and a tear-off fabric. A method for producing a coated composite component including, in this order, a composite component, a fluorine-containing film and/or a fluorine-containing woven fabric, knitted fabric or crocheted fabric, and a tear-off fabric.

20 Claims, 3 Drawing Sheets

(51) Int. Cl.
| | | |
|---|---|---|
| *B32B 3/24* | (2006.01) | |
| *B29C 33/68* | (2006.01) | |
| *B32B 7/06* | (2019.01) | |
| *B32B 33/00* | (2006.01) | |
| *B32B 27/12* | (2006.01) | |
| *B32B 3/08* | (2006.01) | |
| *B32B 3/26* | (2006.01) | |
| B32B 5/14 | (2006.01) | |
| B32B 27/08 | (2006.01) | |
| B32B 5/28 | (2006.01) | |
| B32B 27/32 | (2006.01) | |
| B32B 5/02 | (2006.01) | |
| B32B 27/04 | (2006.01) | |
| B29C 37/00 | (2006.01) | |
| B29C 70/42 | (2006.01) | |
| B29C 70/54 | (2006.01) | |
| D03D 15/00 | (2006.01) | |
| D06M 17/00 | (2006.01) | |
| B32B 15/08 | (2006.01) | |
| B32B 15/14 | (2006.01) | |
| B32B 27/30 | (2006.01) | |
| B32B 43/00 | (2006.01) | |
| B32B 3/14 | (2006.01) | |

(52) U.S. Cl.
CPC ...... *B29C 66/7316* (2013.01); *B29C 66/7392* (2013.01); *B29C 66/73751* (2013.01); *B32B 3/08* (2013.01); *B32B 3/266* (2013.01); *B32B 27/12* (2013.01); *B32B 33/00* (2013.01); *B29C 33/68* (2013.01); *B29C 37/0075* (2013.01); *B29C 70/42* (2013.01); *B29C 70/542* (2013.01); *B32B 3/14* (2013.01); *B32B 5/02* (2013.01); *B32B 5/142* (2013.01); *B32B 5/28* (2013.01); *B32B 15/08* (2013.01); *B32B 15/14* (2013.01); *B32B 27/04* (2013.01); *B32B 27/08* (2013.01); *B32B 27/304* (2013.01); *B32B 27/322* (2013.01); *B32B 43/006* (2013.01); *B32B 2250/44* (2013.01); *B32B 2260/021* (2013.01); *B32B 2260/023* (2013.01); *B32B 2260/046* (2013.01); *B32B 2262/106* (2013.01); *B32B 2305/07* (2013.01); *B32B 2305/076* (2013.01); *B32B 2305/18* (2013.01); *B32B 2305/72* (2013.01); *B32B 2305/77* (2013.01); *B32B 2307/748* (2013.01); *B32B 2605/00* (2013.01); *D03D 15/00* (2013.01); *D06M 17/00* (2013.01); *Y10T 428/2476* (2015.01); *Y10T 428/24331* (2015.01); *Y10T 428/24752* (2015.01); *Y10T 428/31* (2015.01)

(56) References Cited

U.S. PATENT DOCUMENTS

| | | | | |
|---|---|---|---|---|
| 3,996,089 A * | 12/1976 | More | ............... | B29C 70/00 156/235 |
| 4,139,591 A * | 2/1979 | Jurisich | ............... | B29B 15/10 264/257 |
| 4,353,855 A * | 10/1982 | Garabedian | ............... | B29C 37/006 264/126 |
| 4,362,588 A * | 12/1982 | Anton | ............... | B23P 15/04 156/219 |
| 4,548,859 A * | 10/1985 | Kline | ............... | B29C 37/006 427/243 |
| 4,783,362 A * | 11/1988 | Thornton | ............... | B29C 35/08 428/408 |
| 4,822,436 A * | 4/1989 | Callis | ............... | B29C 43/3642 156/211 |
| 4,869,770 A * | 9/1989 | Christensen | ............... | B29C 33/30 156/286 |
| 4,902,215 A * | 2/1990 | Seemann, III | ............... | B29C 43/56 425/406 |
| 4,942,013 A * | 7/1990 | Palmer | ............... | B29C 43/3642 156/285 |
| 5,011,190 A * | 4/1991 | Matsuguchi | ............... | B32B 7/06 283/101 |
| 5,052,906 A * | 10/1991 | Seemann | ............... | B29C 43/203 264/258 |
| 5,129,813 A * | 7/1992 | Shepherd | ............... | B29C 43/3642 156/286 |
| 5,144,534 A * | 9/1992 | Kober | ............... | H05K 3/4691 174/254 |
| 5,281,388 A * | 1/1994 | Palmer | ............... | B29C 70/443 264/257 |
| 5,807,593 A * | 9/1998 | Thompson | ............... | B29C 43/12 264/316 |
| 5,919,413 A * | 7/1999 | Avila | ............... | B29C 66/8122 156/303.1 |
| 5,968,445 A * | 10/1999 | McCarville | ............... | B29C 70/44 156/285 |
| 6,620,369 B1 * | 9/2003 | Mead | ............... | B29C 70/44 264/138 |
| 6,645,610 B1 * | 11/2003 | Reis | ............... | B29C 37/0082 428/297.4 |
| 6,773,655 B1 * | 8/2004 | Tunis, III | ............... | B29C 33/0066 264/257 |
| 6,995,099 B1 * | 2/2006 | Nishimura | ............... | B29C 70/083 442/59 |
| 8,342,017 B1 * | 1/2013 | Bossi | ............... | G01N 19/04 73/150 A |
| 2001/0038170 A1 * | 11/2001 | Buge | ............... | B29C 37/0075 264/510 |
| 2002/0117256 A1 * | 8/2002 | McCormack | ............... | B32B 37/26 156/289 |
| 2003/0003270 A1 * | 1/2003 | Wheatley | ............... | B29C 73/10 428/137 |
| 2003/0011094 A1 * | 1/2003 | Filsinger | ............... | B29C 70/086 264/102 |
| 2003/0025232 A1 * | 2/2003 | Slaughter | ............... | B29C 70/443 264/102 |
| 2004/0053055 A1 * | 3/2004 | Robinson | ............... | B29C 70/36 428/413 |
| 2004/0056392 A1 * | 3/2004 | Callesen | ............... | B29C 70/443 264/571 |
| 2005/0208736 A1 * | 9/2005 | Matsumura | ............... | C09J 7/20 438/460 |
| 2006/0062950 A1 * | 3/2006 | Catella | ............... | B29C 70/44 428/35.2 |
| 2006/0182949 A1 * | 8/2006 | Salnikov | ............... | C08J 7/047 428/327 |
| 2007/0040294 A1 * | 2/2007 | Arelt | ............... | B29C 70/525 264/136 |
| 2007/0102839 A1 * | 5/2007 | McGowan | ............... | B29C 70/342 264/101 |
| 2008/0083494 A1 * | 4/2008 | Sander | ............... | B29C 66/721 156/285 |
| 2008/0116607 A1 * | 5/2008 | Miedema | ............... | B29C 70/446 264/258 |
| 2008/0160248 A1 * | 7/2008 | Jacobsen | ............... | B29C 37/0082 428/113 |
| 2008/0217806 A1 * | 9/2008 | Aijima | ............... | B29C 33/68 264/171.1 |
| 2008/0261014 A1 * | 10/2008 | McGuire | ............... | B29C 37/0025 428/297.1 |
| 2009/0189320 A1 * | 7/2009 | Bolick | ............... | B29C 70/443 264/511 |
| 2009/0273111 A1 * | 11/2009 | Bansal | ............... | B29C 70/443 264/101 |
| 2009/0297788 A1 * | 12/2009 | Dull | ............... | B29C 70/342 428/189 |
| 2009/0321978 A1 * | 12/2009 | Kurtz | ............... | B29C 33/68 264/101 |
| 2010/0024958 A1 * | 2/2010 | Sawicki | ............... | B29C 73/10 156/94 |

(56) References Cited

U.S. PATENT DOCUMENTS

| | | | | |
|---|---|---|---|---|
| 2010/0080952 A1* | 4/2010 | Suzuki | B29B 11/16 | 428/113 |
| 2010/0126658 A1* | 5/2010 | De Vita | B29C 70/44 | 156/243 |
| 2010/0166998 A1* | 7/2010 | Bannister | B29C 63/0021 | 428/61 |
| 2010/0260884 A1* | 10/2010 | Boyeldieu | B29C 43/3642 | 425/387.1 |
| 2010/0297399 A1* | 11/2010 | Utecht | B29C 43/3642 | 428/160 |
| 2010/0310818 A1* | 12/2010 | Pridie | B29C 43/3642 | 428/114 |
| 2012/0121866 A1* | 5/2012 | Hawkins | B29C 70/30 | 428/174 |
| 2012/0125517 A1* | 5/2012 | Galera Cordoba | B29C 70/386 | 156/64 |
| 2012/0196079 A1* | 8/2012 | Brauers | B32B 5/18 | 428/116 |
| 2012/0312469 A1* | 12/2012 | Stiesdal | B29C 33/68 | 156/289 |
| 2013/0129957 A1* | 5/2013 | Zhao | H04W 76/10 | 428/40.1 |
| 2013/0143006 A1* | 6/2013 | Ferguson | B29C 70/342 | 428/189 |
| 2013/0177727 A1* | 7/2013 | Samejima | B29C 70/342 | 428/41.8 |
| 2013/0209163 A1* | 8/2013 | Victorazzo | B29C 65/5057 | 403/267 |
| 2013/0234373 A1* | 9/2013 | Zuardy | B29C 33/10 | 264/571 |
| 2013/0264751 A1* | 10/2013 | Lockett | B29C 70/021 | 264/571 |
| 2013/0280488 A1* | 10/2013 | Flinn | B32B 3/263 | 428/142 |
| 2013/0292861 A1* | 11/2013 | Welch | B29C 33/12 | 264/40.1 |
| 2013/0292885 A1* | 11/2013 | Austinat | B29C 70/68 | 264/571 |
| 2013/0327220 A1* | 12/2013 | De Mulatier | B29C 70/44 | 96/12 |
| 2014/0027048 A1* | 1/2014 | Hawkins | B29C 70/541 | 156/245 |
| 2014/0030459 A1* | 1/2014 | de Rothschild | E04D 1/00 | 428/36.92 |
| 2014/0057096 A1* | 2/2014 | Moser | B32B 5/28 | 428/295.4 |
| 2014/0141234 A1* | 5/2014 | Rogalski | B32B 3/18 | 428/321.5 |
| 2014/0170361 A1* | 6/2014 | Shi | B32B 5/26 | 428/41.8 |
| 2015/0056433 A1* | 2/2015 | MacAdams | B32B 7/06 | 428/221 |
| 2015/0061187 A1* | 3/2015 | Estragnat | B29C 37/0075 | 264/323 |
| 2015/0166748 A1* | 6/2015 | Schibsbye | B29C 33/68 | 428/167 |
| 2015/0283757 A1 | 10/2015 | Koerwien | | |
| 2015/0316027 A1* | 11/2015 | Sandercock | B29C 70/52 | 416/230 |
| 2015/0321385 A1* | 11/2015 | Stege | B29C 33/42 | 264/101 |
| 2016/0136905 A1* | 5/2016 | Filsinger | B29C 70/48 | 264/511 |
| 2016/0282288 A1* | 9/2016 | Degaetano | B29C 35/0288 | |
| 2018/0148610 A1* | 5/2018 | Bernt | B29C 70/543 | |

FOREIGN PATENT DOCUMENTS

| | | | | |
|---|---|---|---|---|
| DE | 102014005146 A1 | | 8/2015 | |
| EP | 0065765 A1 | * | 12/1982 | H05K 3/4691 |
| EP | 0148601 A2 | * | 7/1985 | H05K 3/046 |
| EP | 0893235 A2 | * | 1/1999 | B29C 70/44 |
| FR | 2962681 A1 | * | 1/2012 | B29C 70/54 |
| GB | 2087784 A | * | 6/1982 | B29C 33/42 |
| GB | 2259883 A | * | 3/1993 | B29C 33/424 |
| GB | 2521370 A | * | 6/2015 | B29C 45/14336 |
| JP | 06031744 A | * | 2/1994 | |
| JP | 2014201110 A | * | 10/2014 | B29B 15/10 |
| WO | WO-2009118695 A1 | * | 10/2009 | B29C 70/342 |
| WO | WO-2017021147 A1 | * | 2/2017 | B29C 70/547 |

OTHER PUBLICATIONS

Machine Translation of EP 148601 A2, Jul. 1985 (Year: 1985).*
Lamart Corporation, TF12-53PS, Apr. 2007 (Year: 2007).*
Bron Aerotech, Composites, May 2013 (Year: 2013).*
German Office Action for Application No. 10 2015 225 467.4 dated Aug. 8, 2016.

* cited by examiner

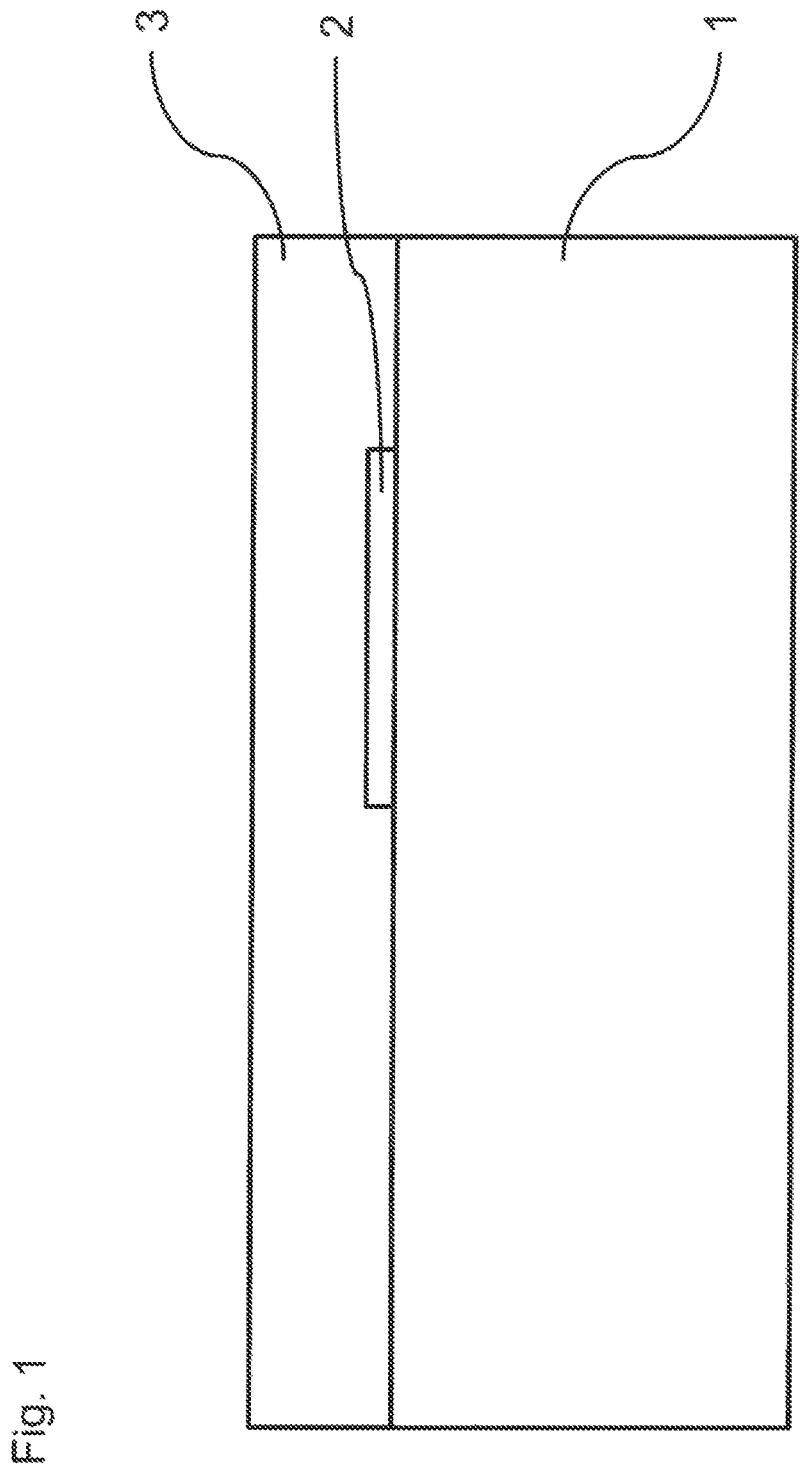

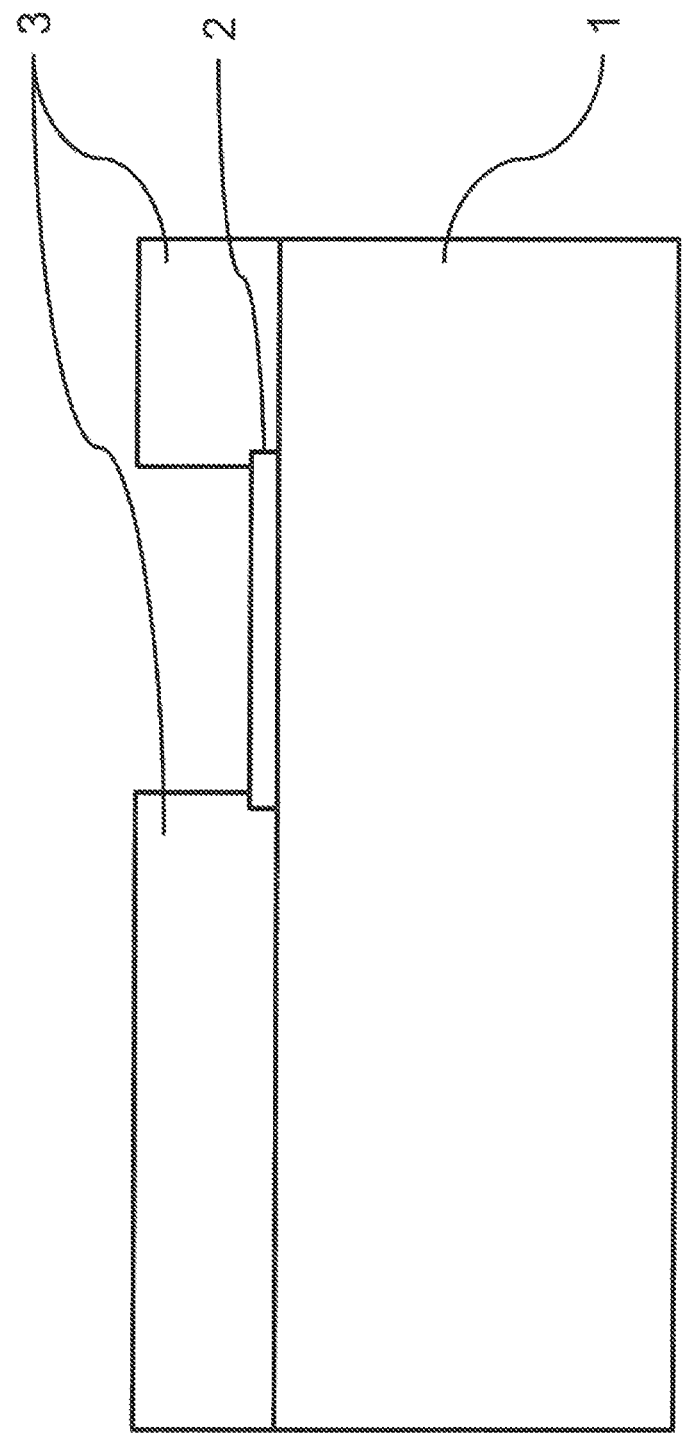

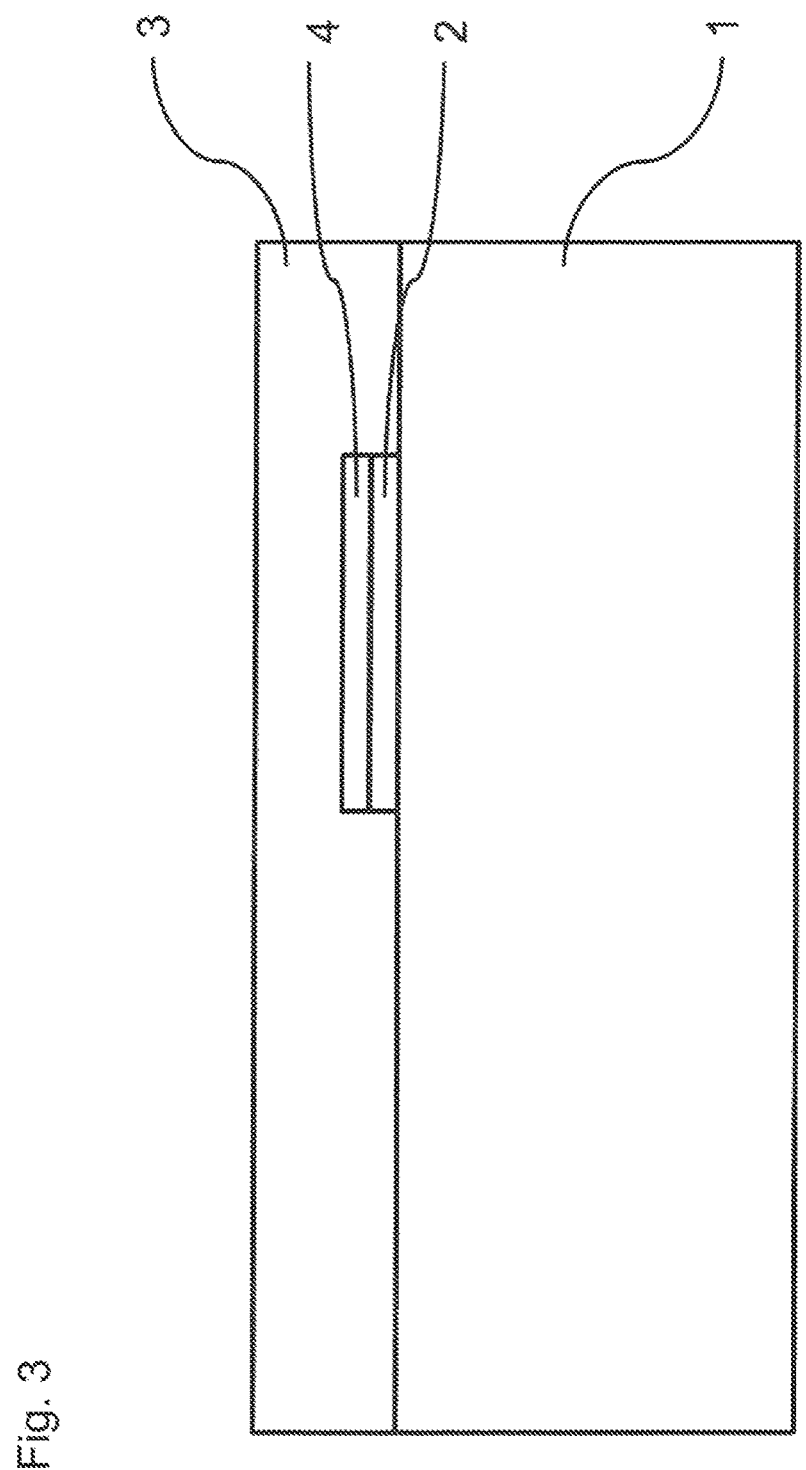

COATED COMPOSITE COMPONENT

CROSS-REFERENCE TO RELATED APPLICATION

This application claims priority to German Patent Application DE 10 2015 225 467.4 filed Dec. 16, 2015, the entire disclosure of which is incorporated by reference herein.

TECHNICAL FIELD

The present disclosure relates to a coated composite component, comprising a composite component, a fluorine-containing film and/or a fluorine-containing woven fabric, knitted fabric or crocheted fabric, and a tear-off fabric, and to a method for producing a coated composite component comprising a composite component, a fluorine-containing film and/or a fluorine-containing woven fabric, knitted fabric or crocheted fabric, and a tear-off fabric.

BACKGROUND

When connecting components, for example when bonding, welding, etc., the cleanliness of the surfaces to be connected of the components is important for the adhesion of the components to one another. In order to keep the surface of the components clean before connection—for example during storage or transportation—there are various options for providing the surface of the components with a coating which can be removed before the connection process.

For example, a tear-off fabric can be applied to the component which can be removed once again before the connection.

Alternatively, a fluorine-containing film and/or a fluorine-containing woven fabric, knitted fabric or crocheted fabric can also be applied to the component, which can likewise be removed before the connection. The use of films, including for the structuring of surfaces, is disclosed for example in DE 10 2014 005 146 A1.

There is a need for coatings for components which can be applied securely, remain securely on the component during storage, transportation, etc. and can easily be removed from the component prior to further use, for example prior to connection to another component, and for a correspondingly coated component.

SUMMARY

One of the ideas of the present disclosure is thus that of providing a coated component which is protected against contamination by the coating and can easily be rid of the coating during further processing, and of providing a method by which such a component can be produced.

A concept on which the present disclosure is based relates to the fact that by a tear-off fabric, a fluorine-containing film and/or a fluorine-containing woven fabric, knitted fabric or crocheted fabric can be attached to a fixed position on the composite component and thus not easily detached therefrom, but a point or surface of the composite component which is to be processed further and is coated with the fluorine-containing film and/or the fluorine-containing woven fabric, knitted fabric or crocheted fabric, does not come into contact with the tear-off fabric. By using the fluorine-containing film, for example a separating film, and/or the fluorine-containing woven fabric, knitted fabric or crocheted fabric, a good surface can be provided after the separation, but the films or woven fabrics, knitted fabrics or crocheted fabrics conventionally have less adhesion to composite components and can accordingly be detached more quickly or easily, for example during transportation, storage or processing. In the case of composite components, such as laminates, which are only coated with such an easily detachable film or the woven fabric, knitted fabric or crocheted fabric, it is difficult to inspect the coating quality, for example by ultrasound inspection.

When pulling the tear-off fabric off the composite component, the fluorine-containing film and/or the fluorine-containing woven fabric, knitted fabric or crocheted fabric is thereby detached from the composite component. The point comprising the fluorine-containing film and/or the fluorine-containing woven fabric, knitted fabric or crocheted fabric can then subsequently be easily cleaned, or additional cleaning is optionally no longer required when the composite component is used again, for example is connected, e.g. bonded or welded, to an additional component. By contrast with this, at the points at which the tear-off fabric has been, cleaning can be more difficult, in particular since a tear-off fabric conventionally has a greater amount of separating agents, which are based in particular on hydrocarbon and/or silicon.

The configurations and developments in the claims may be combined with one another in any desired manner, within reason. Further possible configurations, developments and implementations of the disclosure herein also do not comprise explicitly mentioned combinations of features of the disclosure herein described previously or in the following with respect to the embodiments. In particular, in the process a person skilled in the art will also add individual aspects as improvements or additions to the respective basic form of the present disclosure.

BRIEF DESCRIPTION OF THE DRAWINGS

The disclosure herein will be described in greater detail below on the basis of embodiments with reference to the accompanying figures of the drawings.

In the drawings:

FIG. 1 is a schematic view of an exemplary construction of a coated composite component according to the disclosure herein;

FIG. 2 is a schematic view of another exemplary construction of a coated composite component according to the disclosure herein; and FIG. 3 is a schematic view of yet another exemplary construction of a coated composite component according to the disclosure herein.

In the drawings, the same reference numerals denote like or functionally like components, unless stated otherwise.

DETAILED DESCRIPTION

A coated composite component according to the disclosure herein, comprising, in this order, a composite component, a fluorine-containing film and/or a fluorine-containing woven fabric, knitted fabric or crocheted fabric, and a tear-off fabric or peel ply, wherein the surface area of the fluorine-containing film and/or of the fluorine-containing woven fabric, knitted fabric or crocheted fabric is smaller than the surface area of the tear-off fabric and smaller than the surface area of the composite component. According to specific embodiments, in this case, the fluorine-containing film and/or the fluorine-containing woven fabric, knitted fabric or crocheted fabric is attached or fixed to at least three edges and preferably to all the edges of the composite component by the tear-off fabric. In this case, the tear-off fabric can cover the entire surface area of the fluorine-containing film and/or of the fluorine-containing woven fabric, knitted fabric or crocheted fabric. By fixing to all the edges, it can be ensured that there is no point left at which the fluorine-containing film and/or the fluorine-containing woven fabric, knitted fabric or crocheted fabric is detached in part from the composite component, which could lead to contamination penetrating into the component.

According to the disclosure herein, the composite component is not particularly restricted, but comprises in particular such components for which, during further processing, an extremely clean surface is important, for example during subsequent connection to additional components, such as bonding or welding, for example in the aviation or automotive industries. Examples of composite components include components which are based on resin and/or plastics material, wherein e.g. glass fibers, carbon fibers, aramid fibers, etc. can be incorporated in the fibers or not, for example carbon fibers. In this case, the composite components can be in the form of both uncured, that is to say raw composite components, and also cured composite components. The composite component according to the disclosure herein thus also comprises composite components which are optionally still to be cured. One example of composite components is carbon-fiber-reinforced plastics materials, wherein in this case, the carbon fibers and the plastics materials are not particularly restricted, and the materials can be produced for example by corresponding infusion processes or prepreg processes, e.g. by hot pressing or in autoclaves. Examples of suitable resins for producing the plastics materials include for example epoxides or vinyl esters, e.g. epoxides which are cured at temperatures of around 180° C. According to specific embodiments, the composite component is a carbon-fiber-reinforced plastics material.

Furthermore, the tear-off fabric is also not particularly restricted. However, in particular, the tear-off fabric is stable at high temperatures, and therefore also withstands temperatures of 120° C. or more, preferably 150° C. or more, more preferably 180° C. or more, for example during the curing of a raw composite component comprising a polymer resin, e.g. an epoxy resin, of the type which is used for example in the case of carbon-fiber-reinforced plastics materials. In this case, according to specific embodiments, the tear-off fabric is not coated and in particular does not comprise any fluorine-based layers which impair adhesion. According to specific embodiments, the tear-off fabric comprises separating agents, which are based on silicon or hydrocarbon, in order to ensure sufficient removal of the tear-off fabric from the composite component. Suitable tear-off fabrics include e.g. those by Tygavac Advanced Materials such as Super Release Blue or those comprising Super Release Blue by the Precision Fabrics Group.

According to specific embodiments, the tear-off fabric does not cover the entire surface area of the fluorine-containing film and/or of the fluorine-containing woven fabric, knitted fabric or crocheted fabric. This has the advantage in particular—in addition to saving material—of being able to reduce or prevent local drying of a raw composite component, for example of a prepreg, during the curing of the coated raw composite component at points comprising coatings of a fluorine-containing film and/or of a fluorine-containing woven fabric, knitted fabric or crocheted fabric. For this purpose, according to specific embodiments, the fluorine-containing film and/or the fluorine-containing woven fabric, knitted fabric or crocheted fabric can additionally or alternatively comprise holes or pores, wherein the holes or pores are preferably of a size which prevents contamination, i.e. for example in the nanometer range to the lower end of the micrometer range. In this case, coating the film and/or the woven fabric, knitted fabric or crocheted fabric with the tear-off fabric according to specific embodiments to prevent contamination is then also advantageous. The introduction of holes into the film and/or the woven fabric, knitted fabric or crocheted fabric and/or of openings into the tear-off fabric at the points which are coated with film and/or woven fabric, knitted fabric or crocheted fabric in this case can also take place in accordance with the materials of the film and/or of the woven fabric, knitted fabric or crocheted fabric or of the tear-off fabric.

Likewise, the fluorine-containing film and/or the fluorine-containing woven fabric, knitted fabric or crocheted fabric is not particularly restricted. However, in particular, the fluorine-containing film and/or the fluorine-containing woven fabric, knitted fabric or crocheted fabric is however also stable at high temperatures, and therefore also withstands temperatures of 120° C. or more, preferably 150° C. or more, more preferably 180° C. or more, for example during the curing of a raw composite component comprising a polymer resin, e.g. an epoxy resin, of the type which is used for example in the case of carbon-fiber-reinforced plastics materials. Fluorine-containing films can be produced for example by using fluorinated-hydrocarbon-based compounds, and fluorine-containing woven fabrics, knitted fabrics or crocheted fabrics by using fluorine-containing fibers, which can be produced from such compounds, wherein in this case as well, the compounds are not particularly restricted. The films and/or woven fabrics, knitted fabrics or crocheted fabrics are also not excluded from comprising additional layers which are not based on fluorine-containing materials, but it must then be ensured that a surface of the film or of the woven fabric, knitted fabric or crocheted fabric, which comes into contact with the composite component, comprises fluorine-based materials and in particular consists of or comprises the materials. According to specific embodiments, the film and/or the woven fabric, knitted fabric or crocheted fabric contains fluorine and comprises only fluorine-based materials. Examples of suitable films include Airtech WL5200 and Richmond A6100.

By the fluorine-containing materials at the coating point with the composite component, it can be ensured that no auxiliary materials from the tear-off fabrics, such as separating agent residues, remain at the coating points, which materials can lead to degradation thereof during further processing, such as bonding or welding. Separating agent residues or generally auxiliary material residues from tear-off fabrics can arise from deviations in the composition of auxiliary materials or process deviations, which can lead to fluctuations during further processing, such as bonding or welding.

The dimensions of the fluorine-containing film and/or of the fluorine-containing woven fabric, knitted fabric or crocheted fabric are also not particularly restricted according to the disclosure herein. Preferably, the film and/or the woven fabric, knitted fabric or crocheted fabric is not so thick that stresses occur during the application of the tear-off fabric. It is preferable to use fluorine-containing films, since the films can be applied more easily and are also cheaper.

According to the disclosure herein, it is additionally not excluded that more than one fluorine-containing film and/or one fluorine-containing woven fabric, knitted fabric or crocheted fabric is applied to the composite component—for example at various points, wherein in this case, at least one fluorine-containing film and/or one fluorine-containing woven fabric, knitted fabric or crocheted fabric is attached to the composite component by the tear-off fabric, but preferably all of the films/fabrics are attached. One or more surfaces, according to specific embodiments also the entire surface, of the composite component can also be coated with the tear-off fabric, wherein at at least one point, a fluorine-containing film and/or a fluorine-containing woven fabric, knitted fabric or crocheted fabric is located between the composite component and the tear-off fabric. If a plurality of points of the composite component are coated with more than one fluorine-containing film and/or one fluorine-containing woven fabric, knitted fabric or crocheted fabric, according to specific embodiments, the film or fabrics can be removed during the further processing, even at different times or at the same time, so that flexibility can be achieved during the further processing.

According to specific embodiments, the fluorine-containing film and/or the fluorine-containing woven fabric, knitted fabric or crocheted fabric is located at a point at which the composite component is to be connected to another component. At such points, constant surface quality is important, which can be achieved by using the fluorine-containing film and/or the fluorine-containing woven fabric, knitted fabric or crocheted fabric, wherein any residues from the films and/or woven fabrics, knitted fabrics or crocheted fabrics can easily be cleaned off, e.g. by plasma treatment, for example by atmospheric-pressure plasma or low-pressure plasma. According to specific embodiments, the points can then easily be inspected, in particular in the case of smooth surfaces, e.g. by aerosol wetting, wherein a defined water aerosol is applied. After the removal of the fluorine-containing film and/or of the fluorine-containing woven fabric, knitted fabric or crocheted fabric, the surface can also be examined for remaining traces of fluorine, and thus the surface can be examined.

According to specific embodiments, the fluorine-containing film and/or the fluorine-containing woven fabric, knitted fabric or crocheted fabric is covered at least in part, in particular completely, by a metal sheet. As a result, the film and/or the woven fabric, knitted fabric or crocheted fabric can provide additional strength and stability, which can facilitate fixing during the subsequent application of the tear-off fabric and can also ensure that the film and/or the woven fabric, knitted fabric or crocheted fabric does not slip out of position. A planar surface can also be generated as a result. In this case, the metal sheet is not particularly restricted, but according to specific embodiments, comprises a metal such as Al and/or an alloy, or consists thereof. When using perforated or porous fluorine-containing films and/or fluorine-containing woven fabrics, knitted fabrics or crocheted fabrics, the metal sheet can also be porous or comprise holes which are for example oriented accordingly. In this case, the thickness of the metal sheet is preferably such that, when applying the tear-off fabric, no stresses occur, e.g. 0.5 to 50 mm, preferably 1 to 20 mm, more preferably 2 to 10 mm. In this case, the metal sheet can already be applied thereto before the application of the fluorine-containing film and/or of the fluorine-containing woven fabric, knitted fabric or crocheted fabric, or coated thereon after the application of the film or fabrics.

According to another aspect, the present disclosure relates to a method for producing a coated composite component, in particular the coated composite component according to the disclosure herein, comprising i) providing a raw composite component;
ii) applying a fluorine-containing film and/or a fluorine-containing woven fabric, knitted fabric or crocheted fabric; and
iii) applying a tear-off fabric;

wherein the surface area of the fluorine-containing film and/or of the fluorine-containing woven fabric, knitted fabric or crocheted fabric is smaller than the surface area of the tear-off fabric and smaller than the surface area of the composite component.

In this case, as already explained above, the raw composite component can be a prepreg, which is still to be cured, but it can also be an already manufactured composite component, to which the coatings are to be applied. In this case, a prepreg can comprise for example a curable liquid such as a resin, e.g. an epoxy resin, or a curable foam, and fibers, e.g. carbon fibers.

According to specific embodiments, the raw composite component is an uncured raw composite component, in particular an uncured carbon-fiber-reinforced plastics material. In such a case, a step iv) of curing the coated raw composite component can follow the coating after the application of the tear-off fabric, wherein additional steps are not excluded from following on herefrom.

According to specific embodiments, the fluorine-containing film and/or the fluorine-containing woven fabric, knitted fabric or crocheted fabric is applied to a point at which the composite component is to be connected to another component. In this case, a wide variety of connection geometries can be achieved by the form of the film and/or of the woven fabric, knitted fabric or crocheted fabric, the form of which, for example as a solid body or hollow body, is not restricted.

According to specific embodiments, during the application of the tear-off fabric, the entire surface area of the fluorine-containing film and/or of the fluorine-containing woven fabric, knitted fabric or crocheted fabric is not covered. However, according to specific embodiments, at least all the edges of the fluorine-containing film and/or of the fluorine-containing woven fabric, knitted fabric or crocheted fabric are covered by the tear-off fabric in order to ensure sufficient fixing thereof to the raw composite component. The entire fluorine-containing film and/or the entire fluorine-containing woven fabric, knitted fabric or crocheted fabric can also be covered by the tear-off fabric, or also the entire raw composite component.

According to specific embodiments, the fluorine-containing film and/or the fluorine-containing woven fabric, knitted fabric or crocheted fabric can be porous or comprise holes. Additionally or alternatively, the tear-off fabric can also comprise openings at the points at which the fluorine-containing film and/or the fluorine-containing woven fabric, knitted fabric or crocheted fabric is applied, wherein it is to be ensured that, in this case, the edges thereof are covered by the tear-off fabric.

According to specific embodiments, the fluorine-containing film and/or the fluorine-containing woven fabric, knitted fabric or crocheted fabric is covered at least in part by a metal sheet.

Examples of coated composite components are shown schematically in the accompanying drawings, FIGS. 1 to 3.

FIG. 1 is a schematic view of an embodiment according to the disclosure herein, wherein a composite component 1, in this case for example an uncured or cured carbon-fiber-reinforced plastics material, is shown, to which a fluorine-containing film 2 is applied, which is covered by a tear-off fabric 3, wherein in this case, the tear-off fabric 3 covers for example an entire side of the composite component 1, including the entire fluorine-containing film 2. Of course, as described above, covers on a plurality of sides are also possible, as well as fluorine-containing films on a plurality of sides.

One example of a coated composite component according to the disclosure herein, according to FIG. 1, comprises for example a carbon-fiber-reinforced plastics material, to one side of which a disc-shaped fluorine-containing film (e.g. Airtech WL5200 by the Airtech Advanced Material Group) is applied, to which in turn a tear-off fabric (Super Release Blue by Tygavac Advanced Materials) is applied over the entire surface of the disc.

FIG. 2 is a schematic view of a development of the coated composite component from FIG. 1, wherein in this case, the tear-off fabric 3 does not cover the entire fluorine-containing film 2, but rather only the edges thereof, firstly in order to save material, but also to prevent local drying during the curing of the raw composite component, that is to say for example an uncured carbon-fiber-reinforced plastics material.

The embodiment shown schematically in FIG. 3 in turn builds on the embodiment shown in FIG. 1, wherein in this case, a metal sheet 4 for stabilisation is applied to the fluorine-containing film 1.

Although the present disclosure has been described on the basis of preferred embodiments, it is not restricted to the embodiments, but rather can be modified in various ways.

For example, already connected components can also be coated in turn, in order to protect the components from contamination once again after connection, for example when the connection has taken place in a low-contamination atmosphere such as a vacuum.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A coated composite component comprising,
an uncured composite component;
a fluorine-containing film and/or a fluorine-containing fabric disposed on the composite component; and
a tear-off fabric disposed on the composite component and covering all edges of the fluorine-containing film and/or fabric;
wherein a surface area of the fluorine containing film and/or fabric is smaller than a surface area of the tear-off fabric and smaller than a surface area of the composite component, and
wherein the tear-off fabric only partially covers the surface area of the fluorine-containing film and/or fabric.

2. The coated composite component according to claim 1, wherein the uncured composite component is a carbon-fiber-reinforced plastics material.

3. The coated composite component according to claim 2, wherein the carbon-fiber-reinforced plastics material is in the form of a prepreg.

4. The coated composite component according to claim 2, wherein the plastics material is an epoxy or vinyl ester resin.

5. The coated composite component according to claim 1, wherein the uncured composite component is cured.

6. The coated composite component according to claim 1, wherein the tear-off fabric and/or the fluorine-containing film and/or fabric is/are able to withstand temperatures of 120° C. or more.

7. The coated composite component according to claim 1, wherein the fluorine-containing film and/or fabric is disposed on an area of the composite component that is to be bonded to another component.

8. The coated composite component according to claim 7, wherein the area of the composite component that is to be bonded to another component is easily cleaned or does not require additional cleaning.

9. The coated composite component according to claim 1, wherein the tear-off fabric does not comprise any fluorine-containing material.

10. The coated composite component according to claim 9, wherein the tear-off fabric comprises separating agents based on silicon or hydrocarbon in order to ensure removal of the tear-off fabric from the composite component.

11. The coated composite component according to claim 1, wherein the fluorine-containing film and/or fabric is porous or comprises holes.

12. The coated composite component according to claim 1, wherein the fluorine-containing film fabric is covered at least in part by a metal sheet.

13. The coated composite component according to claim 1, wherein the fluorine-containing fabric comprises a woven fabric, a knitted fabric, or a crocheted fabric.

14. A method for producing a coated composite component, comprising the steps as follows:
i) providing an uncured composite component;
ii) applying a fluorine-containing film and/or a fluorine containing fabric on the composite component; and
iii) applying a tear-off fabric on the composite component such that the tear-off fabric covers all edges of the fluorine-containing film and/or fabric;
wherein a surface area of the fluorine containing film and/or fabric is smaller than a surface area of the tear-off fabric and smaller than a surface area of the composite component, and
wherein the tear-off fabric only partially covers the surface area of the fluorine-containing film and/or fabric.

15. The method according to claim 14, wherein the uncured composite component is a carbon-fiber reinforced plastics material, and the method comprises an additional step of iv) curing the coated raw composite component after applying the tear-off fabric.

16. The method according to claim 15, wherein the tear-off fabric and/or the fluorine-containing film and/or fabric is/are able to withstand temperatures of 120° C. or more during the curing step.

17. The method according to claim 14, wherein the fluorine-containing film and/or fabric is disposed on an area of the raw composite component that is to be bonded to another component.

18. The method according to claim 14, wherein the fluorine-containing film and/or fabric is porous or comprises holes.

19. The method according to claim 14, wherein the fluorine-containing film and/or fabric is covered at least in part by a metal sheet.

20. The method according to claim 14, wherein the fluorine-containing fabric comprises a woven fabric, a knitted fabric, or a crocheted fabric.

* * * * *